US 6,408,182 B1

United States Patent
Davidson et al.

(12) United States Patent
Davidson et al.

(10) Patent No.: US 6,408,182 B1
(45) Date of Patent: Jun. 18, 2002

(54) REDUNDANT MOBILE SWITCHING CENTER (MSC) ARCHITECTURE FOR A RADIO TELECOMMUNICATIONS NETWORK

(75) Inventors: Lee Davidson, McKinney; Eric Valentine, Plano, both of TX (US); Heino Hameleers, Kerkrade (NL)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/356,107

(22) Filed: Jul. 16, 1999

(51) Int. Cl.[7] .............................. H04Q 7/23; H04Q 7/24
(52) U.S. Cl. ..................... 455/433; 455/424; 455/9; 455/8; 455/67.1; 455/433; 455/560; 455/507
(58) Field of Search ................................. 455/423, 424, 455/9, 8, 67.1, 433, 432, 560, 445, 446, 436, 439, 507, 508, 550, 422

(56) References Cited

U.S. PATENT DOCUMENTS 6,067,454 A * 5/2000 Foti ........................... 455/423
6,091,953 A * 7/2000 Ho et al. ..................... 455/433

* cited by examiner

*Primary Examiner*—William Trost
*Assistant Examiner*—Keith Ferguson
(74) *Attorney, Agent, or Firm*—Arthur I. Navarro

(57) ABSTRACT

A telecommunications network architecture and method of providing failover operations between mobile switching centers (MSCs). A plurality of MSCs and at least one base station controller (BSC) are connected to an Internet Protocol (IP) network in which transmission paths and control paths are logically separated. The BSC reports to a primary MSC and includes an alternative MSC list identifying at least one backup MSC for the primary MSC. The BSC determines when the primary MSC has failed, and utilizes a control path in the IP network to notify the backup MSC that the BSC has switched its reporting to the backup MSC. The BSC also utilizes a transmission path in the IP network to send mobile station communications from the BSC to the backup MSC. Mobile station location updating requests are sent from the backup MSC to a home location register (HLR). The requests include a new element that informs the HLR that the backup MSC is now serving the mobile station due to a failure of the primary MSC. Subscriber information is then downloaded from the HLR to a visitor location register (VLR) in the backup MSC. Routing number requests are sent from the HLR to the backup MSC when an incoming call is received in the HLR for a mobile station which has been moved to the backup MSC.

23 Claims, 4 Drawing Sheets

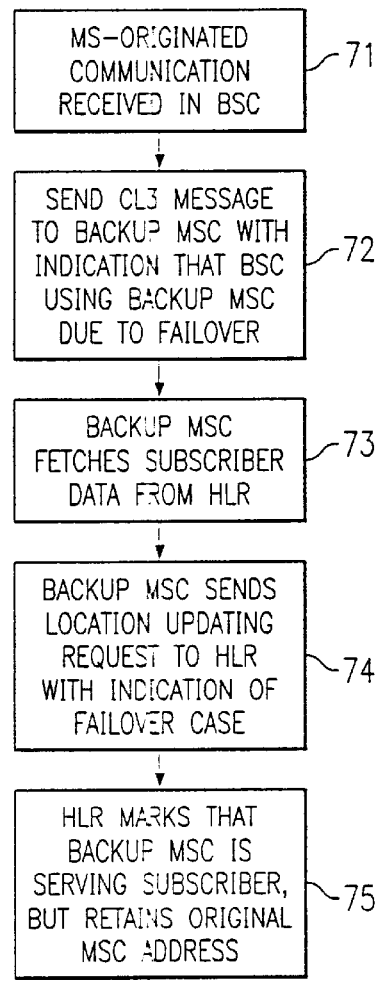
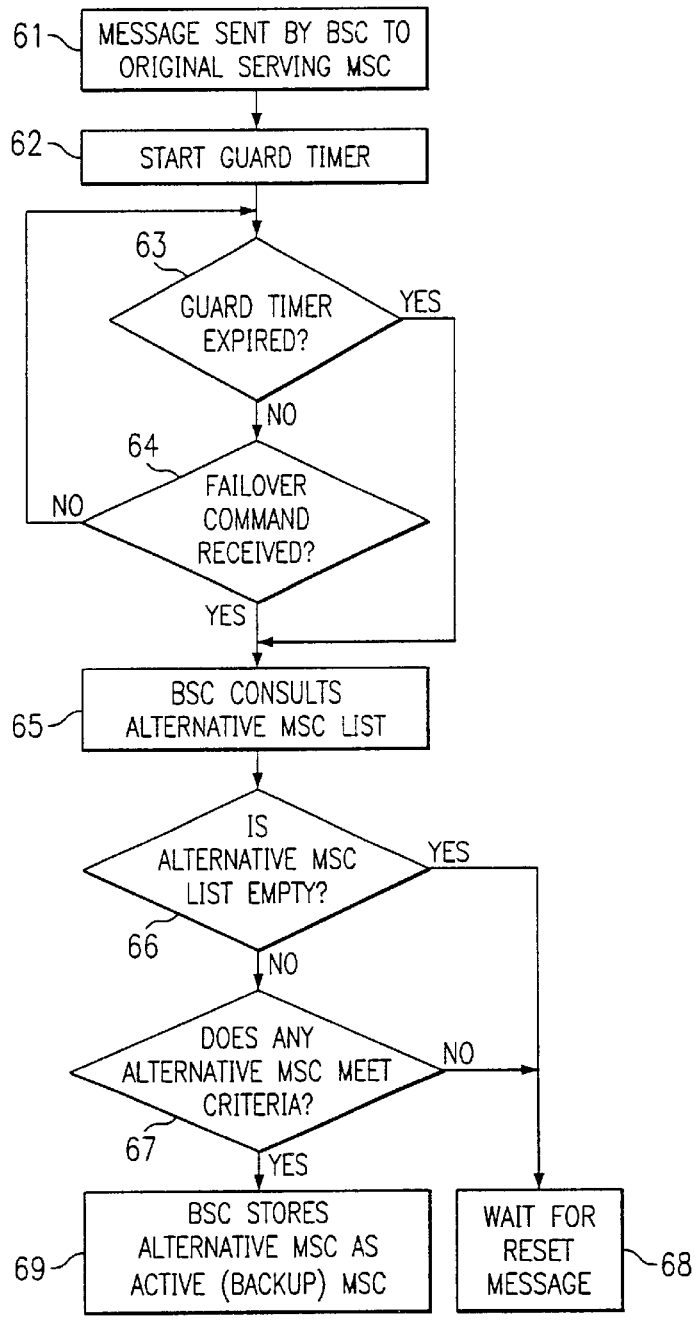

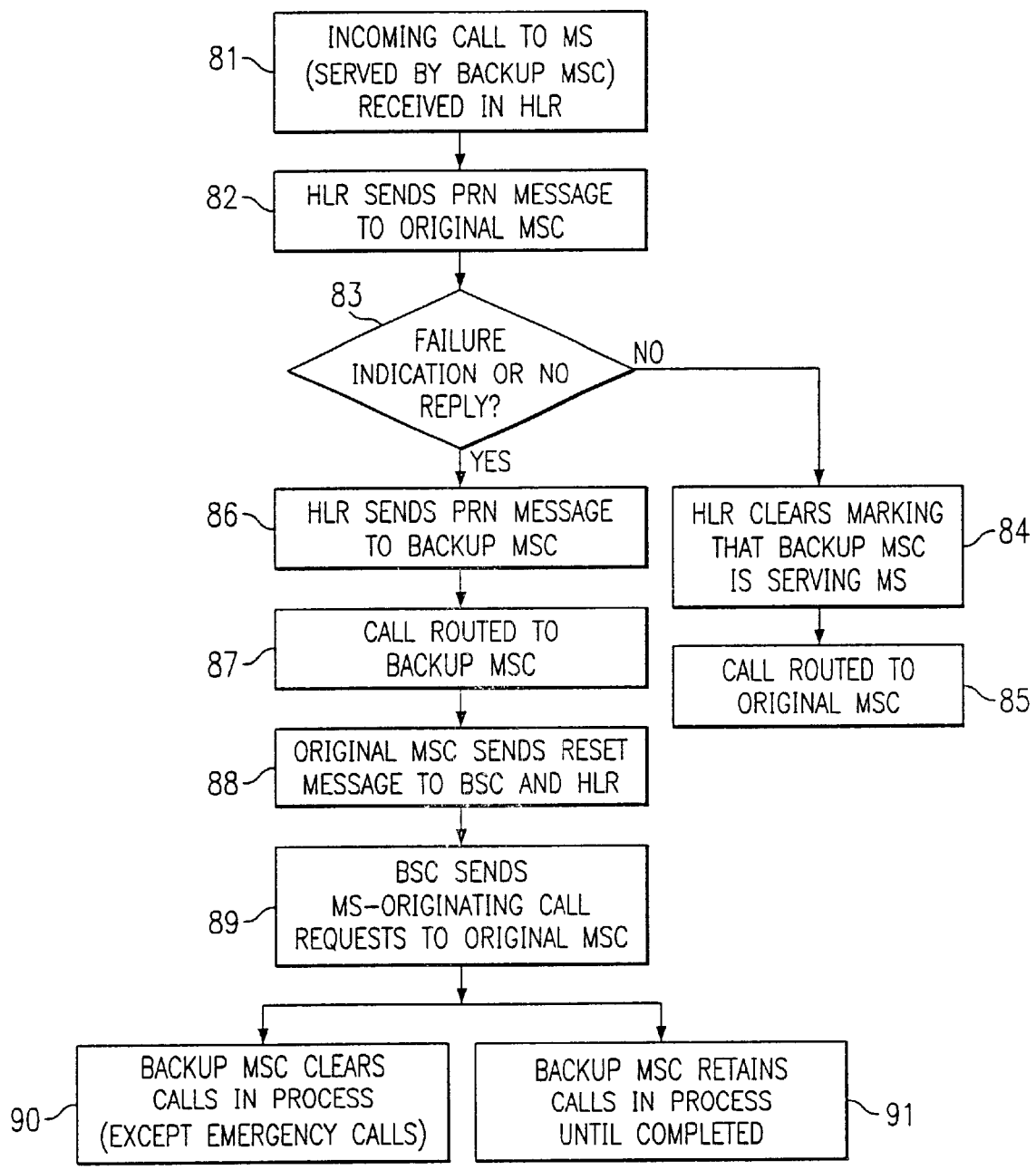

REDUNDANT MOBILE SWITCHING CENTER (MSC) ARCHITECTURE FOR A RADIO TELECOMMUNICATIONS NETWORK

BACKGROUND OF THE INVENTION

1. Technical Field of the Invention

This invention relates to telecommunication systems and, more particularly, to a redundant mobile switching center (MSC) architecture for a radio telecommunications network.

2. Description of Related Art

In existing networks which utilize the Global System for Mobile Communications (GSM), each base station system (BSS) or group of BSSs is controlled by one mobile switching center (MSC). This is because GSM networks today are based on circuit switching, so that the networks are configured as trees. One or more base transceiver stations (BTSs) report to a base station controller (BSC), and one or more BSCs, in turn, report to a "parent" MSC. Therefore, if an MSC goes down, the entire coverage area served by that MSC and its base stations is "off the air," and no one can make use of that part of the network. Thus, the MSC becomes a single point of failure for the entire service area.

In principle, it is possible to configure a radio telecommunications network as a "mesh" network by adding circuits between BSCs and noncontrolling MSCs. However, these circuits are not cost effective to implement since they are dedicated for use only in the failure mode. There has never been a sufficient economic incentive, therefore, to make the modifications required in order to support failover between MSCs.

There are no known prior art teachings of a solution to the aforementioned deficiency and shortcoming such as that disclosed herein. In order to overcome the disadvantage of existing solutions, it would be advantageous to have an architecture for a radio telecommunications network and a method of utilizing the architecture to efficiently provide for MSC redundancy. The present invention provides such a solution.

SUMMARY OF THE INVENTION

In one aspect, the present invention is a telecommunications network architecture providing failover operations between mobile switching centers (MSCs). The network architecture includes a communications network such as an Internet Protocol (IP) network in which transmission paths and control paths are logically separated. A plurality of MSCs and at least one base station controller (BSC) are connected to the network. The BSC reports to a primary MSC and includes an alternative MSC list identifying at least one backup MSC for the primary MSC. The BSC also includes means for determining when the primary MSC has failed, means for notifying the backup MSC that the BSC has switched its reporting to the backup MSC, and means for sending mobile station communications to the backup MSC.

In another aspect, the present invention is a method in a telecommunications network of providing failover operations between MSCs. The network includes a plurality of MSCs, at least one BSC reporting to an original (primary) MSC, and at least one home location register (HLR) associated with mobile stations operating in the coverage area of the BSC. The method includes the steps of connecting the MSCs and the BSC to a communications network such as an IP network in which transmission paths and control paths are logically separated, detecting in the BSC that the primary MSC has failed, and identifying at least one backup MSC for the primary MSC. The method also utilizes a control path in the communications network to notify the backup MSC that the BSC has switched its reporting to the backup MSC, and utilizes a transmission path in the communications network to send mobile station communications from the BSC to the backup MSC.

The method may also include the steps of sending a mobile station location updating request from the backup MSC to the HLR, the location updating request including a new element that informs the HLR that the backup MSC is now serving the mobile station due to a failure of the lo primary MSC. This is followed by downloading subscriber information from the HLR to a visitor location register (VLR) in the backup MSC, and sending routing number requests from the HLR to the backup MSC when an incoming call is received in the HLR for a mobile station which has been moved to the backup MSC.

In yet another aspect, the present invention is a method in a telecommunications network of providing failover operations between MSCs in which the network has a plurality of MSCs, at least one BSC reporting to an original (primary) MSC, and at least one HLR associated with mobile stations operating in the coverage area of the BSC. The method includes the steps of connecting the MSCs and the BSC to an IP network in which transmission paths and control paths are logically separated, detecting in the BSC that the primary MSC has failed, identifying at least one backup MSC for the primary MSC, and switching operations to the backup MSC utilizing a control path in the IP network. Then, in each cell affected by primary MSC failure, the BSC broadcasts an indication of when each mobile station is to perform location updating. Thereafter, the BSC sends mobile station communications to the backup MSC utilizing a transmission path in the IP network.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIGS. 3A–3C are a flow chart illustrating the steps of a first failover method in accordance with the teachings of the present invention.

DETAILED DESCRIPTION OF EMBODIMENTS

Figure 1:
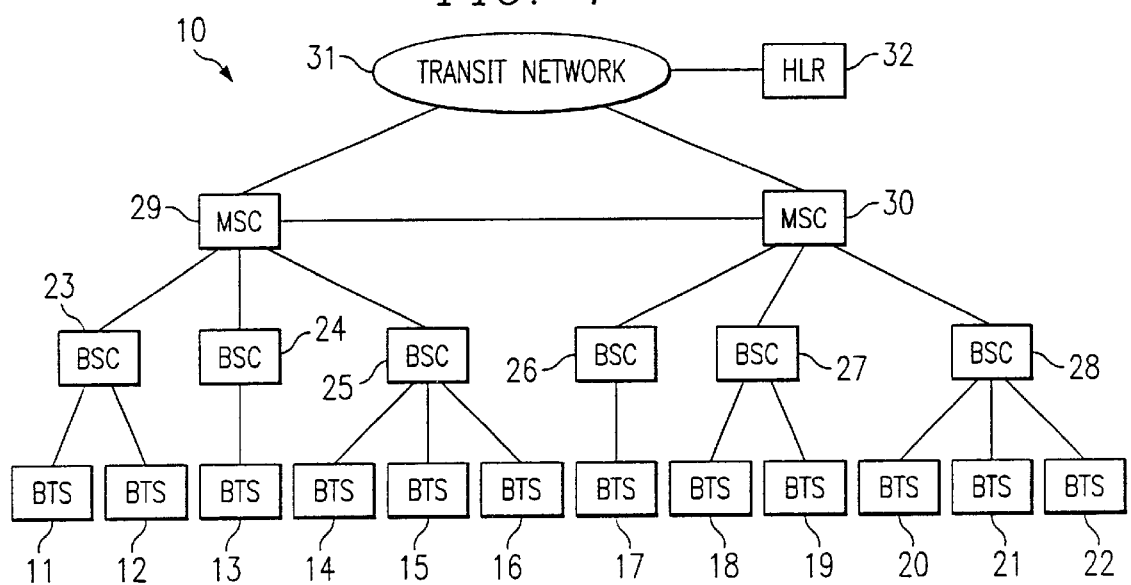
FIG. 1 (Prior Art) is a simplified block diagram of an existing radio telecommunications network architecture such as that utilized in the Global System for Mobile Communications (GSM)

FIG. 1 is a simplified block diagram of an existing radio telecommunications network architecture 10 such as that utilized in the Global System for Mobile Communications (GSM). A plurality of base transceiver stations (BTSs) 11–22 report to base station controllers (BSCs) 23–28. The BSCs, in turn, report to a "parent" MSCs 29 and 30. The MSCs are connected to each other and to other MSCs or other networks (not shown) through a transit network 31. Each MSC is connected through intersystem signaling links to a home location register (HLR) 32. It is readily apparent from FIG. 1 that if MSC 29 or MSC 30 goes down, the entire coverage area served by that MSC and its base stations is will be without service until the malfunctioning MSC can be repaired. Thus, each MSC is a single point of failure for its entire service area.

Figure 2:
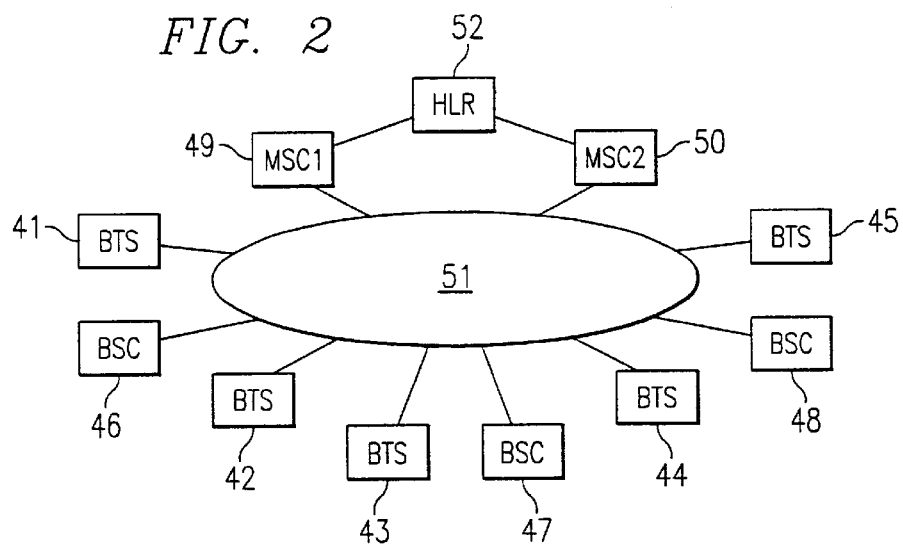
FIG. 2 is a simplified block diagram of the preferred embodiment of the radio telecommunications network architecture of the present invention.

FIG. 2 is a simplified block diagram of the preferred embodiment of the radio telecommunications network architecture of the present invention. In this architecture, BTSs 41–45, BSCs 46–48, and MSCs 49–50 are all connected to an Internet Protocol (IP) network 51, or to any other network in which the transmission paths and control paths are logically separated. Each MSC is connected through inter-system signaling links to a home location register (HLR) 52. In this configuration, it becomes possible, and more economically viable, to create a system in which a backup MSC can take control for a primary MSC which has failed. When additional mechanisms are implemented with the IP network configuration, full MSC redundancy is provided, thereby preventing inconvenient and expensive service outages.

Each BSC or each radio network controller (RNC) maintains a list of MSCs in the network. This list includes at least one MSC that is a default master MSC, and at least one MSC that is an alternate MSC. The list may include multiple alternate MSCs and other selection criteria in order to reduce the possibility that the load from a failed radio network is switched to an already overloaded MSC. For example, the selection criteria may include the time-of-day and/or day-of-week since certain MSCs may be more heavily loaded at different times of the day or on different days. The alternative MSC addresses may be stored in a number of different formats such as, for example, Point Code, Global Title, Ordinal Identifier, IP address, E.164 number, an other equivalent type formats.

A first method of "fail over" to a backup MSC is shown in FIGS. 3A–3C. Referring first to FIG. 3A, the method starts when a message is sent from the BSC (for example BSC 46) to the original (primary) MSC (for example MSC 49) at step 61. The message may be, for example a PING (status request) or a Complete Layer 3 (CL3) message, etc. At 62, a guard timer in the BSC is started. If the guard timer expires at 63 without receiving a response from MSC 49, or if a failover command is received in the BSC at 64, the BSC consults an alternative MSC list at 65. The failover command may be received on the Signaling Connection Control Part (SCCP) level, the Message Transfer Protocol (MTP), the Transaction Control Protocol (TCP) level, or the Internet Protocol (IP) level.

A single backup MSC on the alternative MSC list may cover the entire BSC coverage area, or multiple backup MSCs may be implemented on a cell-by-cell basis. If it is determined at 66 that the alternative MSC list is empty, or it is determined at 67 that none of the alternative MSCs meet the switchover criteria, the method moves to step 68 where the BSC 46 does nothing except wait for a RESET or an equivalent message. If it is determined that the alternative list is not empty at 67, and at least one of the MSC alternatives meets the switchover criteria at 68 (e.g., correct time-of-day), then the BSC stores the alternative MSC meeting the criteria as the active (backup) MSC (for example MSC 50). The BSC may begin or continue pinging the original MSC 49 (periodically interrogating the original MSC for its status) to determine when operation is restored. Alternatively, the BSC may wait for a RESET message or equivalent. The method then moves to FIG. 3B, step 71.

At step 71, an MS-originated communication is received in the BSC 46 (in GSM this is the sequence started by the Channel Request and Set Asynchronous Balanced Mode, leading to construction of a Complete Layer 3 (CL3) Message). At 72, the CL3 message is then sent to the backup MSC 50 with an indication that the BSC is now using the backup MSC due to a failover. Sending the CL3 message to the backup MSC causes it to fetch the subscriber data from the subscriber's Home Location Register (HLR) 52 and store the data it in the backup MSC's Visitor Location Register (VLR) at 73. Thereafter, when the backup MSC sends a location updating request to the HLR at 74, a new element is added to the request that informs the HLR that the registration is due to a failover case. This causes the HLR to mark in its records that a backup MSC is handling the subscriber at 75. The original MSC address, however, is also retained in the HLR.

Referring to FIG. 3C, an incoming call to the mobile station is received at 81 after implementation of the backup MSC 50, and when the mobile station is being served by the backup MSC. At 82, the HLR 52 sends a Provide Roaming Number (PRN) message to the original MSC 49. At 83, it is determined whether or not the BSC 46 receives a failure indication from the MSC (or no reply at all). If not, then the original MSC is operational again, and the method moves to step 84 where the HLR clears the marking that a backup MSC is serving the mobile station. At 85, the call is then routed to the original MSC. If the HLR receives a failure indication or no reply from the original MSC at 83, the HLR sends a PRN message to the backup MSC at 86. The call is then routed to the backup MSC at 87, and the backup MSC is used until the original MSC sends a RESET message, or equivalent, to the BSC and HLR at 88 indicating that the original MSC is again operational. At 89, the BSC resumes sending mobile-originated call requests to the original MSC.

Two alternative approaches may be utilized for handling ongoing calls which are being handled by the backup MSC 50 when the original MSC 49 resumes operation. First, the method may progress to step 90 where the backup MSC clears any calls in process unless they are emergency calls. Alternatively, the method may move to step 91 where the backup MSC retains calls in process until they are completed. In order to do this, the BSC 46 must know how to route control messages on a percall basis so that control messages for ongoing calls are routed to the backup MSC, and control messages for new calls are routed to the original MSC 49. If the BSC cannot do this, then control messages for all calls, or all calls from particular cells, for example, must be routed to a particular MSC. Additionally, for incoming calls to any mobile stations involved in ongoing calls in the backup MSC, the HLR 52 continues to direct such calls to the backup MSC. Additional Mobile Application Part (MAP) signaling may be employed to reject, for example, the PRN message for these subscribers during this phase.

Once the BSC 46 has sent the first CL3 message to the new backup MSC (and VLR) 50, it is possible for data for the subscribers in the affected service area to be distributed between the original MSC/VLR 49 and the backup MSC/VLR. This is because the original MSC/VLR may have retained the subscriber records it had before the failure, or, due to its failure, it may have lost all previous subscriber data. However, the method described above allows standard GSM recovery and call procedures to be utilized to re-achieve consistency between the VLR and HLR data. Note that no modifications are required to procedures executed in the original failed MSC unless it is desired to add specific messages to initiate this failover procedure.

Modifications are made, however, to the HLR 52 and to MAP signaling messages. Both types of modifications can be accomplished utilizing an extension area within the MAP protocol that can be used for this purpose. Note also that it is not necessary to modify all HLRs to handle the failover procedure. Instead, the MSCs in the network may keep track of which HLRs have been modified for the procedure.

Figure 4A:
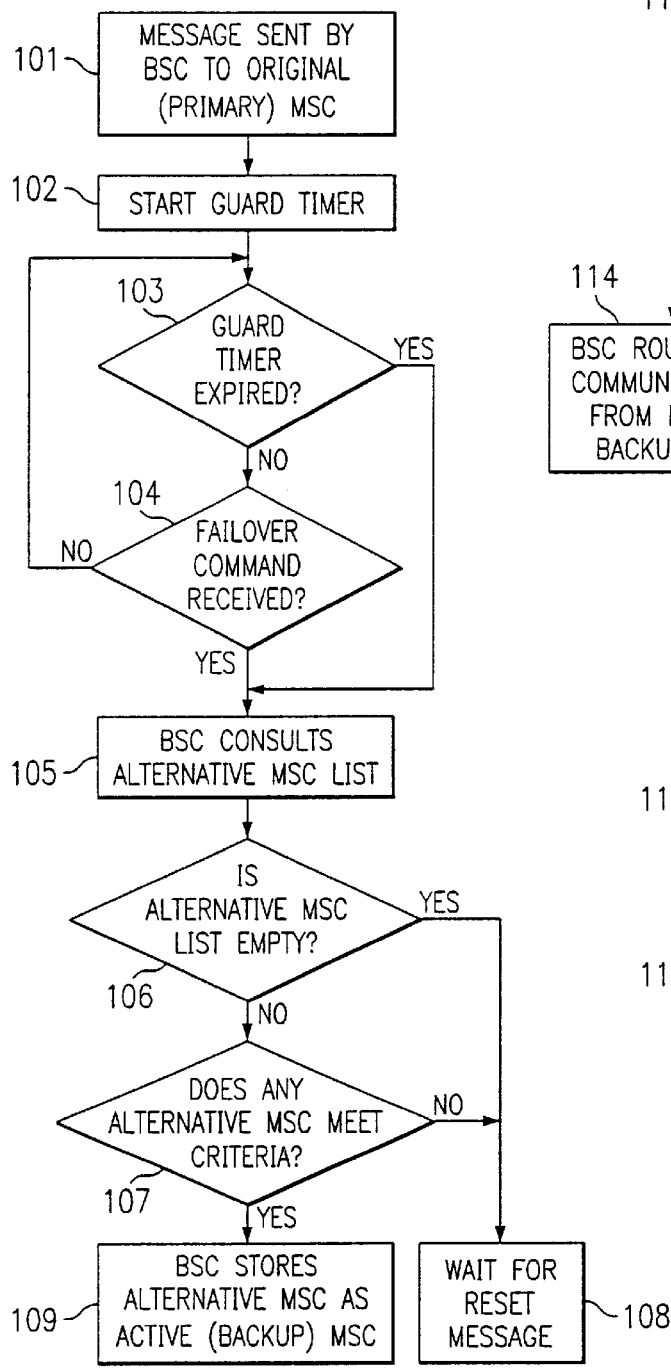
FIGS. 4A–4B are a flow chart illustrating the steps of a second failover method in accordance with the teachings of the present invention.
Figure 4B:
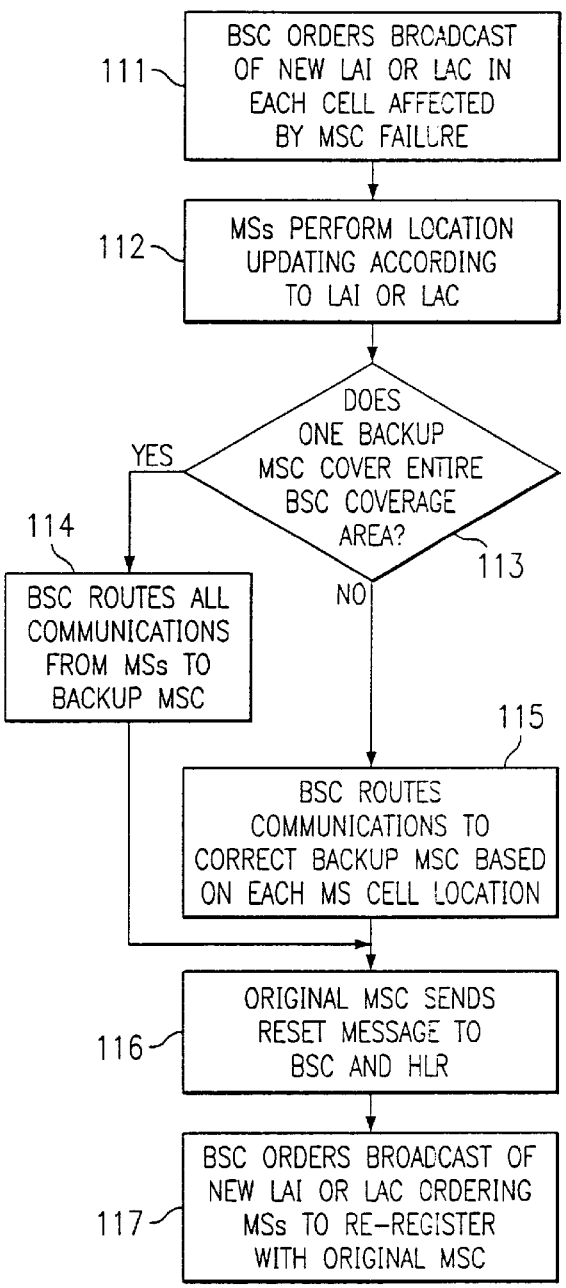

FIGS. 4A–4B are a flow chart illustrating the steps of a second failover method in accordance with the teachings of the present invention. In this alternative method, no changes are made to MAP messages or to the HLR 52. Steps 100–109 of FIG. 4A are identical to steps 60–69 of FIG. 3A, and for conciseness, their description will not be repeated here.

Referring then to FIG. 4B, the method continues at step 111 where, in each of the cells in the affected area, the BSC 46 orders BTSs 41–45 to broadcast a new Location Area Identifier (LAI) or Location Area Code (LAC) or other identifier which is used by the mobile stations to determine when to perform location updating. In order to avoid overloading the network, changes on the Broadcast Control Channel (BCCH) may be phased across the different cells so that all mobile stations do not will perform location updating at the same time. The mobile stations then perform location updating at 112 according to the broadcast LAI or LAC.

As noted above, a backup MSC on the alternative MSC list may cover the entire BSC coverage area, or backup MSCs may be implemented on a cell-by-cell basis. Therefore at step 113 it is determined whether a single backup MSC is utilized to cover the entire coverage area of the BSC. If so, the method moves to step 114 where the BSC 46 routes all communications from mobile stations in its coverage area to the single backup MSC 50. If there is more than one backup MSC implemented, for example, on a cell-by-cell basis, the method moves to step 115 where the BSC routes communications from the mobile stations to the correct backup MSC based on each mobile station's cell location. The BSC also tracks which communications transactions are in use from which cells, and whether each transaction is being used for an emergency call.

At step 116, the original MSC 49 resumes operation and sends a RESET message to the BSC 46. At 117, the BSC then orders the BTSs 41–45 to broadcast a new LAI or LAC ordering the mobile stations to re-register with the original MSC. The BSC may clear existing connections from mobile stations that are still using the backup MSC 50, with the possible exception of emergency calls. This is done because the HLR will continue to direct incoming calls toward these subscribers while they are involved in calls, and it may be a long time before the mobile stations leave dedicated mode long enough to receive the information on the BCCH. The BSC may allow calls from some cells to use one MSC while calls from another cell use another MSC during the switch-back period.

In the method described above, the BSC itself initiates the cell broadcast, and the BSC contains the alternative MSC list. In further alternative embodiments, the BSC may receive an order from an Operation and Maintenance (O&M) Center or a Network Operation Center to initiate the change on the BCCH. The information used for the broadcast may come either from the O&M center itself or from the BSC.

It is thus believed that the operation and construction of the present invention will be apparent from the foregoing description. While the network architecture and method of providing failover operations shown and described has been characterized as being preferred, it will be readily apparent that various changes and modifications could be made therein without departing from the scope of the invention as defined in the following claims.

What is claimed is:

1. A telecommunications network architecture providing failover operations between mobile switching centers (MSCs), said network architecture comprising:
   a communications network in which transmission paths and control paths are logically separated;
   a plurality of MSCs connected to the network; and
   at least one base station controller (BSC) connected to the network and reporting to a primary MSC, the BSC including:
      an alternative MSC list identifying at least one backup MSC for the primary MSC;
      means for determining when the primary MSC has failed;
      means for notifying the backup MSC that the BSC has switched its reporting to the backup MSC; and
      means for sending mobile station communications to the backup MSC.

2. The telecommunications network architecture of claim 1 wherein the communications network is an Internet Protocol (IP) network.

3. The telecommunications network architecture of claim 1 wherein the BSC has a coverage area comprising a plurality of cells, and the alternative MSC list identifies a backup MSC for each cell in the BSC's coverage area.

4. The telecommunications network architecture of claim 1 wherein the means within the BSC for determining when the primary MSC has failed includes a guard timer which determines that no acknowledgment has been returned by the primary MSC in response to a message sent by the BSC within a predetermined time period.

5. The telecommunications network architecture of claim 1 wherein the means within the BSC for determining when the primary MSC has failed includes means for receiving a failover command in the BSC.

6. The telecommunications network architecture of claim 1 wherein the means for notifying the backup MSC that the BSC has switched its reporting to the backup MSC includes means for sending a Complete Layer 3 (CL3) message to the backup MSC with an indication that the BSC is now reporting to the backup MSC.

7. The telecommunications network architecture of claim 1 wherein the network architecture also includes a home location register (HLR), and the backup MSC includes means for sending a mobile station location updating request from a the backup MSC to the HLR, said location updating request including a new element that informs the HLR that the backup MSC is now serving the mobile station due to a failure of the primary MSC.

8. The telecommunications network architecture of claim 7 wherein the HLR includes means for sending routing number requests to the backup MSC when an incoming call is received in the HLR for a mobile station which has been moved to the backup MSC.

9. The telecommunications network architecture of claim 8 wherein the HLR also includes:
   means for determining when the primary MSC is restored to operation; and
   means for sending subsequent routing number requests to the primary MSC.

10. The telecommunications network architecture of claim 1 wherein the BSC also includes:
   means for determining when the primary MSC is restored to operation; and means for sending subsequent mobile station communications to the primary MSC.

11. The telecommunications network architecture of claim 10 wherein the means for determining when the primary MSC is restored to operation includes means within the BSC for receiving a RESET message from the primary MSC indicating that the primary MSC has been restored to operation.

12. The telecommunications network architecture of claim 10 wherein the means for determining when the primary MSC is restored to operation includes means within the BSC for periodically interrogating the primary MSC for its status.

13. A method in a telecommunications network of providing failover operations between mobile switching centers (MSCs), said network having a plurality of MSCs, at least one base station controller (BSC) reporting to an original (primary) MSC, and at least one home location register (HLR) associated with mobile stations operating in the coverage area of the BSC, said method comprising the steps of:
connecting the MSCs and the BSC to a communications network in which transmission paths and control paths are logically separated;
detecting that the primary MSC has failed;
identifying at least one backup MSC for the primary MSC;
utilizing a control path in the communications network, notifying the backup MSC that the BSC has switched its reporting to the backup MSC; and
utilizing a transmission path in the communications network, sending mobile station communications from the BSC to the backup MSC.

14. The method of providing failover operations between MSCs of claim 13 wherein the step of connecting the MSCs and the BSC to a communications network includes connecting the MSCs and the BSC to an Internet Protocol (IP) network.

15. The method of providing failover operations between MSCs of claim 13 wherein the step of identifying at least one backup MSC for the primary MSC includes identifying at least one backup MSC from an alternative MSC list in the BSC, said backup MSC meeting predefined criteria.

16. The method of providing failover operations between MSCs of claim 13 wherein the step of notifying the backup MSC that the BSC has switched its reporting to the backup MSC includes sending a Complete Layer 3 (CL3) message to the backup MSC with an indication that the BSC is now reporting to the backup MSC.

17. The method of providing failover operations between MSCs of claim 13 further comprising the steps of:
sending a mobile station location updating request from the backup MSC to the HLR, said location updating request including a new element that informs the HLR that the backup MSC is now serving the mobile station due to a failure of the primary MSC;
downloading subscriber information from the HLR to a visitor location register (VLR) in the backup MSC; and
sending routing number requests from the HLR to the backup MSC when an incoming call is received in the HLR for a mobile station which has been moved to the backup MSC.

18. The method of providing failover operations between MSCs of claim 17 further comprising the steps of:
determining in the HLR when the primary MSC is restored to operation; and
sending subsequent routing number requests from the HLR to the primary MSC when an incoming call is received in the HLR for a mobile station which has been moved back to the restored primary MSC.

19. The method of providing failover operations between MSCs of claim 18 further comprising clearing, by the backup MSC, any calls in process when the primary MSC is restored.

20. The method of providing failover operations between MSCs of claim 19 further comprising retaining, by the backup MSC, any emergency calls in process when the primary MSC is restored.

21. The method of providing failover operations between MSCs of claim 18 further comprising retaining, by the backup MSC, any calls in process when the primary MSC is restored, said retaining step including:
routing control messages for calls in process to the backup MSC; and
routing control messages for new calls to the primary MISC.

22. The method of providing failover operations between MSCs of claim 13 further comprising the steps of:
determining in the BSC when the primary MSC is restored to operation; and
sending subsequent mobile station communications from the BSC to the primary MSC.

23. A method in a telecommunications network of providing failover operations between mobile switching centers (MSCs), said network having a plurality of MSCs, at least one base station controller (BSC) reporting to an original (primary) MSC, and at least one home location register (HLR) associated with mobile stations operating in the coverage area of the BSC, said method comprising the steps of:
connecting the MSCs and the BSC to an Internet Protocol (IP) network in which transmission paths and control paths are logically separated;
detecting in the BSC that the primary MSC has failed;
identifying at least one backup MSC for the primary MSC;
switching operations to the backup MSC utilizing a control path in the IP network;
in each cell affected by primary MSC failure, broadcasting by the BSC, an indication of when each mobile station is to perform location updating; and
sending mobile station communications from the BSC to the backup MSC utilizing a transmission path in the IP network.

* * * * *